United States Patent
Kuramitsu (10) Patent No.: US 9,660,565 B2
(45) Date of Patent: May 23, 2017

(54) CONTROLLER FOR CONTROLLING A MOTOR

(71) Applicant: DENSO CORPORATION, Kariya, Aichi-pref. (JP)

(72) Inventor: Shuji Kuramitsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/043,213

(22) Filed: Feb. 12, 2016

(65) Prior Publication Data

US 2016/0241183 A1 Aug. 18, 2016

(30) Foreign Application Priority Data

Feb. 17, 2015 (JP) .................................. 2015-28669

(51) Int. Cl.
| | |
|---|---|
| H02P 7/00 | (2016.01) |
| H02P 21/06 | (2016.01) |
| H02P 25/22 | (2006.01) |
| B62D 5/04 | (2006.01) |

(52) U.S. Cl.
CPC .............. *H02P 21/06* (2013.01); *B62D 5/046* (2013.01); *H02P 25/22* (2013.01)

(58) Field of Classification Search
CPC ............................... H02P 29/024; H02P 27/08
USPC ......................................................... 318/432
IPC ........................................... H02P 29/024,27/08
See application file for complete search history.

(56) References Cited

U.S. PATENT DOCUMENTS

| | | | |
|---|---|---|---|
| 2014/0207335 A1* | 7/2014 | Mikamo | B62D 5/046 701/41 |
| 2014/0253009 A1 | 9/2014 | Kimpara et al. | |
| 2014/0368150 A1* | 12/2014 | Furukawa | B62D 5/0403 318/564 |

* cited by examiner

*Primary Examiner* — Erick Glass
(74) *Attorney, Agent, or Firm* — Knobbe, Martens, Olson & Bear, LLP (57) ABSTRACT

A controller in an electric power steering system controls motor that assists a steering operation of a steering wheel by a driver by generating an assist torque. The controller includes an instruction calculator calculating a base assist instruction value and at least one of correction instruction values, a distributor distributing the instruction values a plurality of winding wire groups, and calculating a torque instruction value for each of the plurality of winding wire groups. Thus, the base assist instruction value and the correction instruction values are appropriately distributed to each of the plurality of winding wire groups, for an appropriate distribution of the instruction values among the plurality of winding wire groups for generating the assist torque.

9 Claims, 7 Drawing Sheets

CONTROLLER FOR CONTROLLING A MOTOR

CROSS REFERENCE TO RELATED APPLICATION

The present application is based on and claims the benefit of priority of Japanese Patent Application No. 2015-028669, filed on Feb. 17, 2015, the disclosure of which is incorporated herein by reference.

TECHNICAL FIELD

The present disclosure generally relates to a controller for driving a motor of an electric power steering device.

BACKGROUND INFORMATION

Conventionally, the electric power steering device having a motor as its source of driving power is known. For example, as disclosed in a patent document, JP 2013-153619 A (Patent document 1), an electric power steering device has a first inverter for applying a voltage to a first winding wire and a second inverter for applying a voltage to a second winding wire, and a voltage applied to the second finding wire is controlled based on a deviation of the electric currents (i.e., a difference between an electric current supplied to the first winding wire, and an electric current supplied to the second winding wire).

The controller of an alternating current rotating electric machine disclosed in the patent document 1 is applied to the electric power steering device. In the patent document 1, an electric current instruction value is calculated so that the alternating current rotating electric machine (i.e., a motor), generates an assist torque that assists a steering torque of the steering system. However, the patent document 1 is silent on how the assist torque that assists the steering torque is distributed among each of the plural systems of the winding wires.

SUMMARY

It is an object of the present disclosure to provide a controller that appropriately distributes the instruction value concerning the assist torque to each of the plural wiring wire groups.

The controller for controlling a motor in the present disclosure controls a motor in an electric power steering system. The motor has a plurality of winding wire groups respectively for generating an assist torque that assists a steering operation of a steering member which is performed by a driver. Further, in the electric power steering system, an inverter is provided in a corresponding manner to each of the winding wire groups. The controller includes an instruction calculator, a distributor, and an electric current control section.

The instruction calculator calculates a base assist instruction value and at least one correction instruction value.

The distributor calculates, for each of the plurality of winding wire groups, a distributed instruction value for each of the base assist instruction value, and the at least one correction instruction value by distributing the base assist instruction value and the at least one correction instruction value.

The electric current control section controls the electric current flowing in each of the plurality of winding wire groups based on the distributed instruction value.

The controller of the present disclosure is provided with the distributor, and the distributor distributes, to each of the winding wire groups, each of the base assist instruction value and the correction instruction value, for example, according to the characteristics of each of the base assist instruction value and the correction instruction value, and the like.

In such manner, the base assist instruction value and the correction instruction value are appropriately distributed to each of the winding wire groups, and the distributed instruction value for each of the winding wire groups is appropriately calculated. Therefore, interference between two or more controls (e.g., an assist control for a steering assist of a driver's operation and plural system controls for an automated driving) may be reduced.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the control device by the present disclosure is described based on the drawings. In the following embodiments, like parts have like numbers, and description of the like parts is not repeated.

First Embodiment

The controller in the first embodiment of the present disclosure is described based on FIGS. 1-4.

Figure 1:
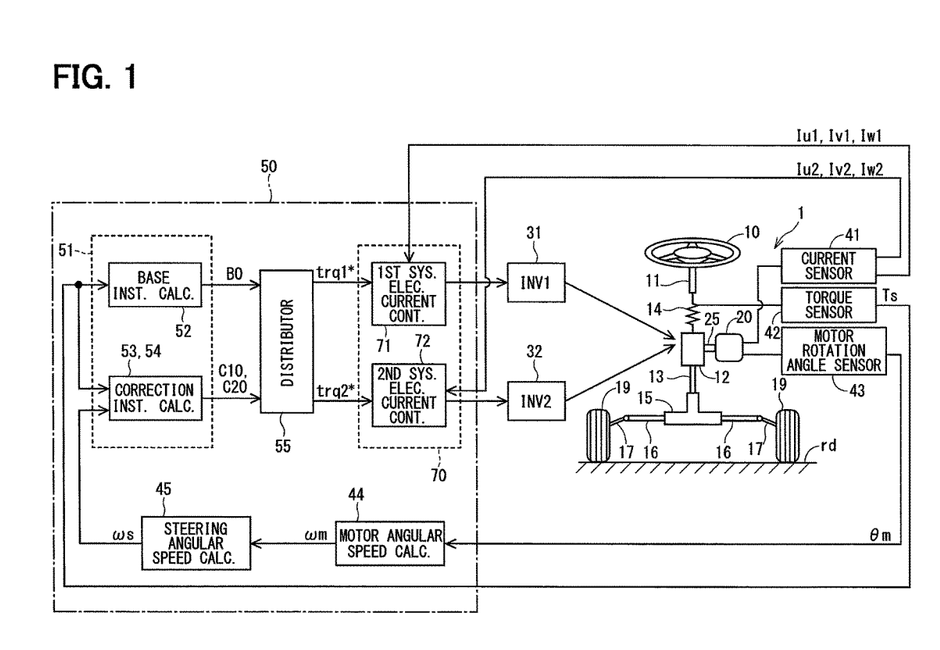
FIG. 1 is a block diagram of a controller in a first embodiment of the present disclosure.

A controller 50 of the present embodiment controls the drive of a motor used in an electric power steering system 1 as shown in FIG. 1.

The electric power steering system 1 includes a steering wheel 10 as a steering member, an input shaft 11, a column shaft 12, an intermediate shaft 13, a torsion bar 14, the motor 20, a gear 25, a steering device 15, a current sensor 41, a torque sensor 42, a motor rotation angle sensor 43 (which may simply be designated hereafter as a "rotation angle sensor"), and the like.

The steering wheel 10 steered by the driver is connected with one end of the input shaft 11. The input shaft 11 is connected with the column shaft 12 by the torsion bar 14.

The column shaft 12 is connected with an opposite end of the input shaft 11 (i.e., an end opposite to the steering wheel 10 connected end of the input shaft 11) by the torsion bar 14. The motor 20 is connected with the column shaft 12 via the gear 25. The torque that is output from the motor 20 is transmitted to the column shaft 12 via the gear 25 as an assist torque, and such a torque assists a rotation of the column shaft 12. That is, the electric power steering system 1 of the present embodiment is of a column assist type, where the rotation of the column shaft 12 is assisted by the assist torque of the motor 20. However, not only the column assist type, but also a rack assist type of electric power steering system may also be applicable to the present disclosure.

The intermediate shaft 13 connects the column shaft 12 and the steering device 15, and transmits the rotation of the column shaft 12 to the steering device 15.

The steering device 15 is constituted by a rack and pinion mechanism having a rack and pinion (not illustrated), and converts a rotation of the column shaft 12 transmitted to the steering device 15 via the intermediate shaft 13 into a translational reciprocal movement of the rack. A tie rod 16 is provided on both ends of the rack. The tie rod 16 moves reciprocally to the right and to the left with the rack (i.e., pulls and pushes a knuckle arm 17 provided at a position between the tie rod 16 and a wheel 19). Thereby, the wheel 19, which contacts a road surface rd, is steered.

Figure 2:
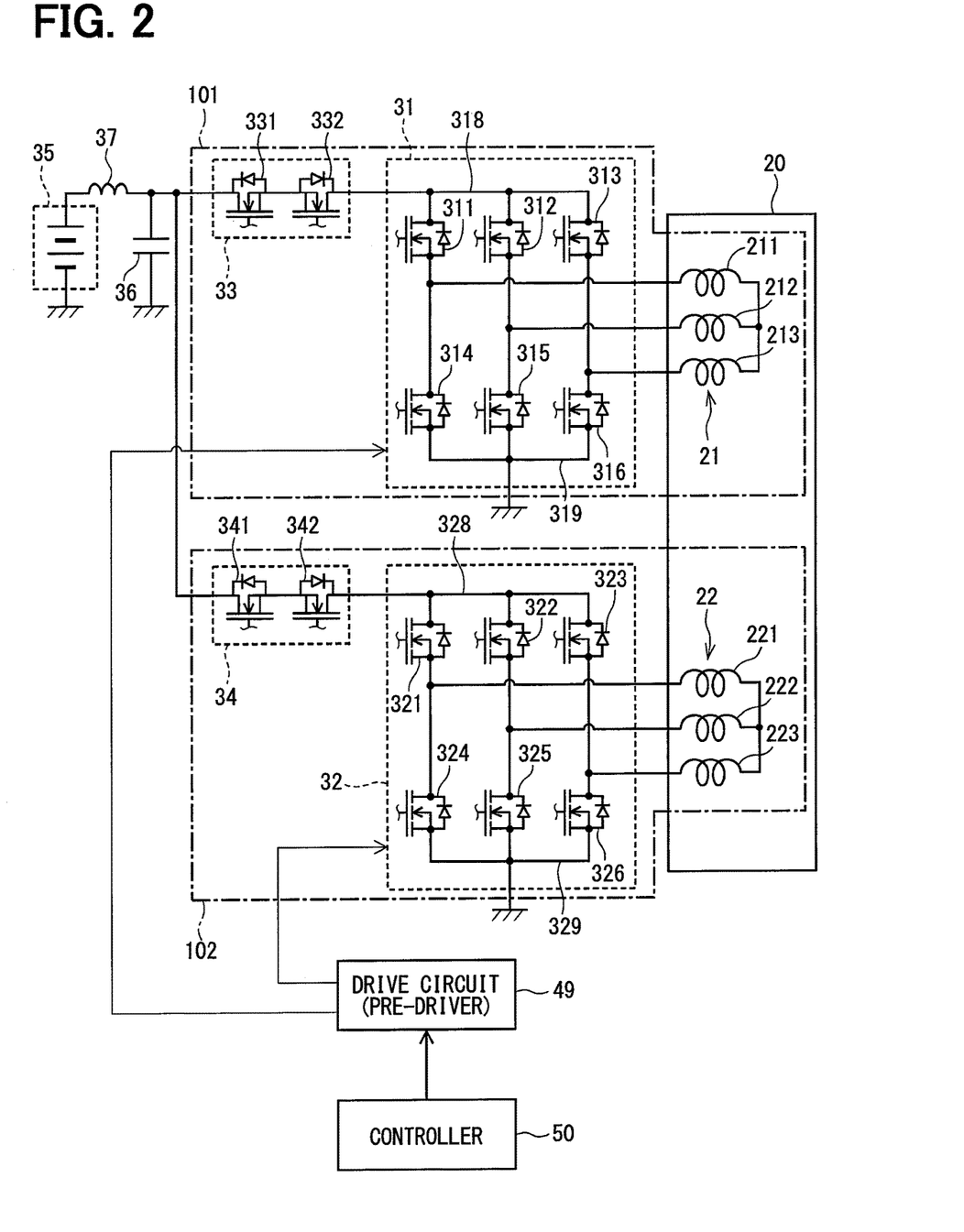
FIG. 2 is a circuit diagram of a motor and an inverter in the first embodiment of the present disclosure.

As shown in FIG. 2, the motor 20 is an electric motor of three-phase alternating current, and has a rotor and a stator (not illustrated). The stator has two systems of winding wires wound on the stator (i.e., a first system winding wire group 21 and a second system winding wire group 22 are wound on the stator).

The first system winding wire group 21 comprises a U1 coil 211, a V1 coil 212, and a W1 coil 213. The second system winding wire group 22 comprises a U2 coil 221, a V2 coil 222, and a W2 coil 223.

A first system inverter 31 has six switching elements 311-316, and switches the power supply to the first system winding wire group 21.

The drain of each of the high potential side switching elements 311, 312, and 313, which are the switching elements provided on the high potential side, is connected with a positive electrode of a battery 35 via a high side bus line 318. The source of each of the high potential side switching elements 311, 312, and 313 is connected with the drain of the low potential side switching elements 314, 315, and 316, which are the switching elements provided on the low potential side.

The source of each of the low potential side switching elements 314, 315, and 316 is connected with the ground via a low side bus line 319. The junction point between a pair of the switching elements (i.e., junction points of three pairs of the high potential side switching elements 311, 312, 313 and the low potential side switching elements 314, 315, 316) are respectively connected with an end of the U1 coil 211, an end of the V1 coil 212, and an end of the W1 coil 213.

A second system inverter 32 has six switching elements 321-326, and switches the power supply to the second system winding wire group 22.

The drain of each of the high potential side switching elements 321, 322, and 323, which are the switching elements provided on the high potential side, is connected with the positive electrode of the battery 35 via a high side bus line 328. The source of each of the high potential side switching elements 321, 322, and 323 is connected with the drain of the low potential side switching elements 324, 325, and 326, which are the switching elements provided on the low potential side.

The source of each of the low potential side switching elements 324, 325, and 326 is connected with the ground via a low side bus line 329. The junction point between a pair of the switching elements (i.e., junction points of three pairs of the high potential side switching elements 321, 322, 323 and the low potential side switching elements 324, 325, 326) are respectively connected with an end of the U2 coil 221, an end of the V2 coil 222, and an end of the W2 coil 223.

A relay 33 is provided on the high side bus line 318. The relay 33 consists of a power relay 331 and a reverse connection protection relay 332. The power relay 331 conducts or intercepts the electric current between the first system inverter 31 and the battery 35. The reverse connection protection relay 332 is provided at a position between the first system inverter 31 and the power relay 331.

A relay 34 is provided on the high side bus line 328. The relay 34 consists of a power relay 341 and a reverse connection protection relay 342. The power relay 341 conducts or intercepts the electric current between the second system inverter 32 and the battery 35. The reverse connection protection relay 342 is provided at a position between the second system inverter 32 and the power relay 341.

Although the switching elements 311-316, 321-326 and the relays 331, 332, 341, 342 are all implemented as a Metal Oxide Semiconductor Field Effect Transistor (MOSFET), other kinds of elements may also be usable as the switching elements and the relays, such as an Insulated-Gate Bipolar Transistor (IGBT) and the like.

The reverse connection protection relays 332 and 342 are connected in 10*o* reverse, relative to the connection direction of the respective power relays 331 and 341. Such a configuration provides protection for the electronic components such as the first system inverter 31, the second system inverter 32 and the like, by preventing a reverse electric current to flow to those inverters 31, 32 and the like when, for example, the battery 35 is inadvertently connected in reverse to the circuit.

A capacitor 36 and a choke coil 37 are provided at a position between (i) the first system inverter 31 and the second system inverter 32, and (ii) the battery 35. The capacitor 36 and the choke coil 37 serve as a filter circuit, reducing the noise transmitted to and from the other device that shares the same battery 35 (i.e., the device such as the motor 20, the inverters 31 and 32 and the like).

As shown in FIG. 1, the current sensor 41 detects the electric current supplied to each phase of the two winding wire groups (i.e., a U1 electric current Iu1, a V1 electric current Iv1, a W1 electric current Iw1 supplied to the phases of the first system winding wire group 21; and a U2 electric current Iu2, a V2 electric current Iv2, and a W2 electric current Iw2 supplied to the phases of the second system winding wire group 22).

Hereafter, the U1 electric current Iu1, the V1 electric current Iv1, the W1 electric current Iw1; and the U2 electric current Iu2, the V2 electric current Iv2, and the W2 electric current Iw2 may also be designated as phase currents Iu1, Iv1, Iw1; and Iu2, Iv2, and Iw2.

The torque sensor 42 detects a torsion torque based on a twist angle of the torsion bar 14. According to the present embodiment, the torsion torque detected by the torque sensor 42 is designated as "a steering torque Ts."

The rotation angle sensor 43 detects a motor rotation angle θm, which is the rotation angle of the motor 20. According to the present embodiment, the motor rotation angle θm is considered as a mechanical angle.

Detection signals concerning the phase currents Iu1, Iv1, Iw1, Iu2, Iv2, and Iw2 that are detected by the current sensor 41, a detection signal concerning the steering torque Ts detected by the torque sensor 42, and a detection signal concerning the motor rotation angle θm detected by the rotation angle sensor 43 are outputted to the controller 50.

Figure 3:
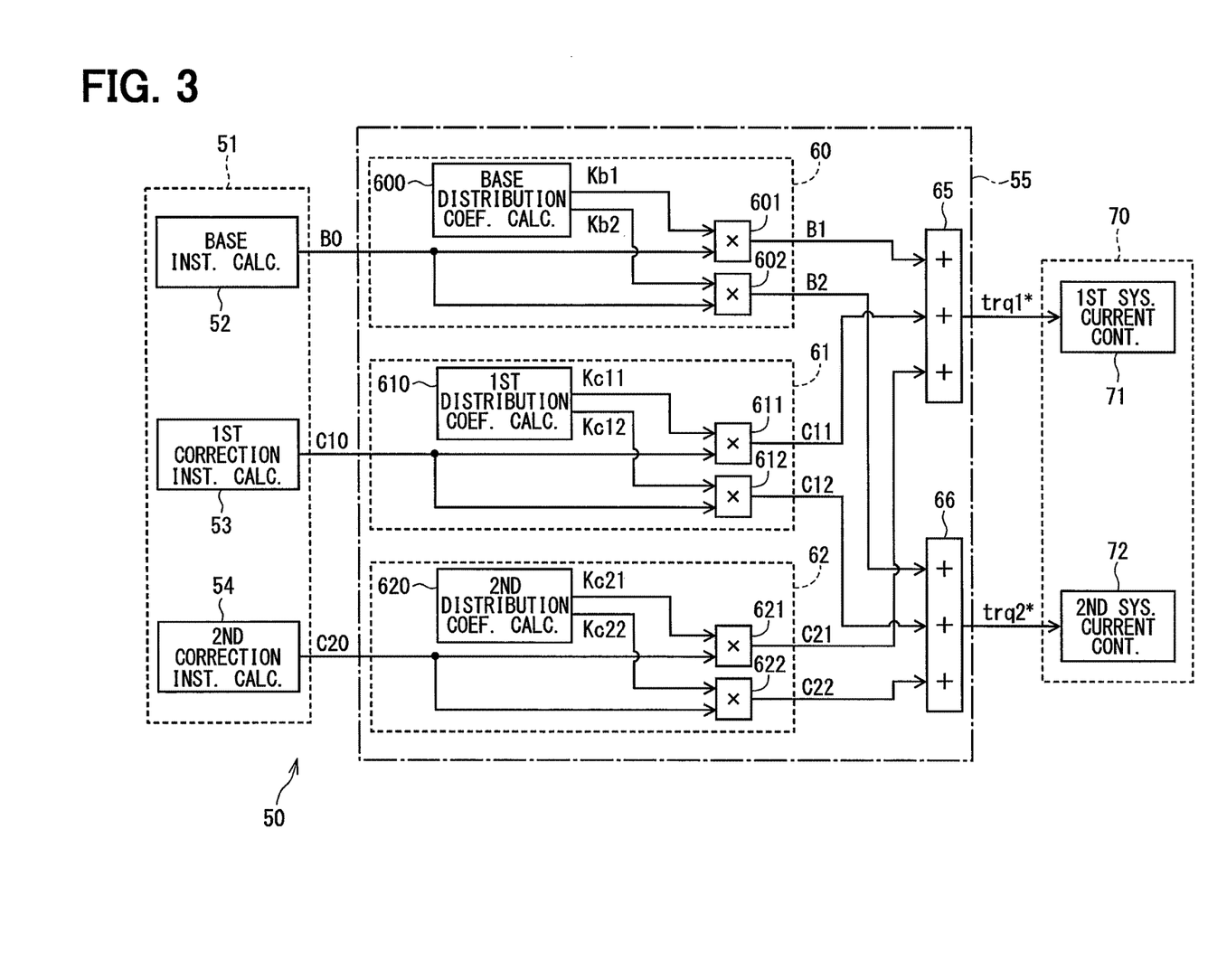
FIG. 3 is a block diagram of a distributer in the first embodiment of the present disclosure.

As shown in FIGS. 1 to 3, the controller 50 manages a control of the motor 20, and, is provided as a microprocessor or the like to perform various operations and calculations by using Central Processing Unit (CPU), Read-Only Memory (ROM), (Random-Access Memory (RAM), Input/Output (I/O), and the bus line that connects these elements, etc., in the microprocessor.

Each of many processes in the controller 50 may be a software process by an execution of a pre-memorized program by CPU, or may be a hardware process provided by an electronic circuit dedicated for such process.

The controller 50 generates a control signal that controls switching ON and OFF of the switching elements 311-316, 321-326 based on the detection values and the like from the current sensor 41, the torque sensor 42, the rotation angle sensor 43, etc. The generated control signal is outputted to the gate of the switching elements 311-316, 321-326 via a drive circuit (i.e., a pre-driver) 49.

Further, the controller 50 controls an ON-OFF operation of the relays 331, 332, 341, and 342. In FIG. 2, for the ease of the reading and understanding of the circuit, control lines connected to the relays 331, 332, 341, 342 are omitted from the drawing. Further, in FIGS. 1, 4 and other drawing, the drive circuit 49 is not illustrated.

According to the present embodiment, the first system winding wire group 21, the first system inverter 31, and the relay 33 serve as "a first system 101," and the second system winding wire group 22, the second system inverter 32, and the relay 34 serve as "a second system 102."

As shown in FIGS. 1 and 3, the controller 50 has a motor angular speed calculator 44, a steering angular speed calculator 45, an instruction calculator 51, a distributor 55, and an electric current control section 70 and the like.

The motor angular speed calculator 44 calculates a motor angular speed cam based on a motor rotation angle θm.

The steering angular speed calculator 45 converts the motor angular speed ωm into a steering angular speed ωs based on the gear ratio of the gear 25, etc.

The instruction calculator 51 has a base instruction calculator 52, a first correction instruction calculator 53, and a second correction instruction calculator 54.

The base instruction calculator 52, the first correction instruction calculator 53, and the second correction instruction calculator 54 perform calculation by using, for example, at least a part of a vehicle speed, a steering wheel angle, and the motor rotation angle θm, the motor angular speed ωm, the steering angular speed ωs, together with other parameters.

The base instruction calculator 52 calculates a base assist instruction value B0 according to the steering torque Ts.

The first correction instruction calculator 53 calculates a correction instruction value C10 that corrects the base assist instruction value B0.

The second correction instruction calculator 54 calculates a correction instruction value C20 that corrects the base assist instruction value B0.

In the correction instruction calculators 53 and 54, a control for improving a convergence of a steering operation, a control regarding a vehicle motion and the like are performed, and the correction instruction values (C10, C20) corresponding to each of those controls are calculated for such controls. In the present embodiment, an example of having two calculators 53, 54 is described. However, the number 'n' of correction instruction values (i.e., 'n' in natural number) may be changed according to the number of correction controls.

Although the assist control of the present embodiment comprises a base assist control and a correction assist control, those two controls are realized by using only one motor 20, and thereby interference between the two controls may arise, resulting in an unintended control.

Therefore, according to the present embodiment, instead of evenly distributing the instruction values B0, C10, and C20 to each of the two systems (i.e., evenly to the systems 101 and 102), each of the instruction values B0, C10, C20 are distributed to the first system 101 and to the second system 102 based on the characteristics of each of those instruction values B0, C10, C20 and the like.

As shown in FIG. 3, the distributor 55 has a base distributor 60, a first correction distributor 61, a second correction distributor 62, a first system instruction calculator 65, and a second system instruction calculator 66; and calculates a first system torque instruction value trq1* and a second system torque instruction value trq2*.

According to the present embodiment, the first system torque instruction value trq1* and the second system torque instruction value trq2* respectively correspond to a "distributed instruction value."

The base distributor 60 has a base distribution coefficient calculator 600 and multipliers 601 and 602.

The base distribution coefficient calculator 600 calculates distribution coefficients Kb1 and Kb2 concerning distribution of the base assist instruction value B0 according to a valuation function. In the present embodiment, the distribution coefficients Kb1 and Kb2 are the outputs of the valuation function. The same applies to the other distribution coefficients.

Each of the distribution coefficients Kb1 and Kb2 is a number between zero and one (i.e., 0≤Kb1, Kb2≤1), and the sum of the distribution coefficients Kb1 and Kb2 is equal to 1. That is, 0≤Kb1≤1 and 0≤Kb2≤1, and Kb1+Kb2=1.

The multiplier 601 performs the multiplication of the distribution coefficient Kb1 to the base assist instruction value B0, and calculates a first system assist instruction value B1.

The multiplier 602 performs the multiplication of the distribution coefficient Kb2 to the base assist instruction value B0, and calculates a second system assist instruction value B2.

In such manner, the base assist instruction value B0 is distributed to the first system assist instruction value B1 and the second system assist instruction value B2 according to the valuation function.

The first correction distributor 61 has a first distribution coefficient calculator 610 and multipliers 611 and 612.

The first distribution coefficient calculator 610 calculates a distribution coefficient Kc11 and a distribution coefficient Kc12 concerning distribution of the first correction instruction value C10, according to the valuation function.

Each of the distribution coefficients Kc11 and Kc12 is a number between zero and one, and the sum of the distribution coefficient Kc11 and Kc12 is equal to 1. That is, 0≤Kc11≤1 and 0≤Kc12≤1, and Kc11+Kc12=1.

The multiplier 611 performs the multiplication of the distribution coefficient Kc11 to the first correction instruction value C10, and calculates a first system correction instruction value C11.

The multiplier 612 performs the multiplication of the distribution coefficient Kc12 to the first correction instruction value C10, and calculates a second system correction instruction value C12.

The second correction distributor 62 has a second distribution coefficient calculator 620 and multipliers 621 and 622.

The second distribution coefficient calculator 620 calculates a distribution coefficient Kc21 and a distribution coefficient Kc22 concerning distribution of the second correction instruction value C20, according to the valuation function.

Each of the distribution coefficients Kc21 and Kc22 is a number between zero and one, and the sum of the distribution coefficients Kc21 and Kc22 is equal to 1. That is, $0 \leq Kc21 \leq 1$ and $0 \leq Kc22 \leq 1$, and $Kc21+Kc22=1$.

The multiplier 621 performs the multiplication of the distribution coefficient Kc21 to the second correction instruction value C20, and calculates a first system correction instruction value C21.

The multiplier 622 performs the multiplication of the distribution coefficient Kc22 to the second correction instruction value C20, and calculates a second system correction instruction value C22.

The correction distributor is provided according to the number of the correction instruction values that are required to be calculated.

The valuation function used for the calculation of the distribution coefficient is set to reduce interference between the base assist control and each of the correction controls. Further, the setting regarding each of the valuation functions may preferably be configured based on a consideration of the maximum value of the output from the motor 20 and the like, according to the base assist instruction value B0 and each of the correction instruction values C10, C20.

The first system instruction calculator 65 adds the first system assist instruction value B1 and the first system correction instruction values C11 and C21, and calculates the first system torque instruction value trq1*.

The second system instruction calculator 66 adds the second system assist instruction value B2 and the second system correction instruction value C12 and C22, and calculates the second system torque instruction value trq2*.

The electric current control section 70 has a first system electric current control section 71 and a second system electric current control section 72, and controls the electric current which flows to the winding wire groups 21 and 22.

Figure 4:
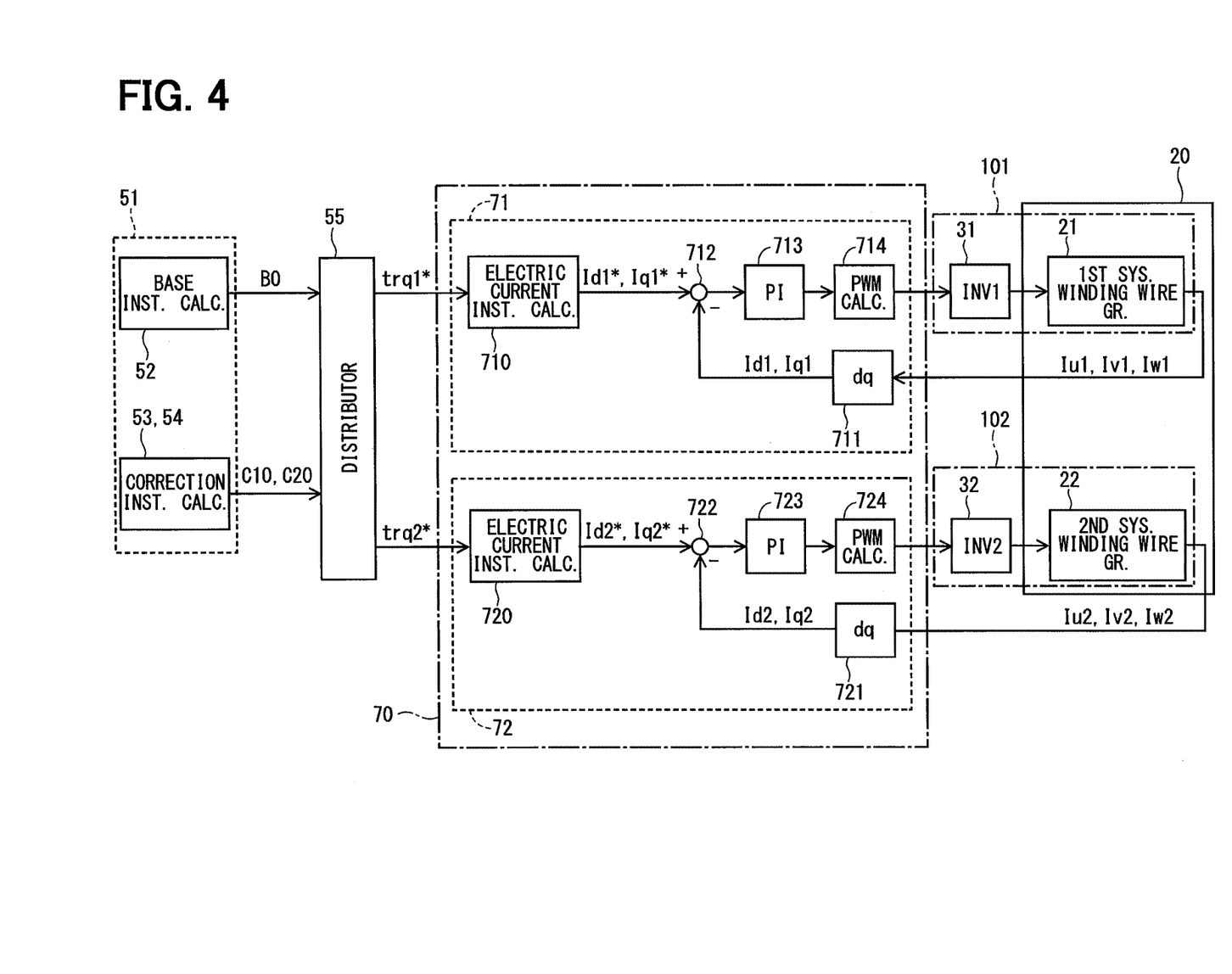
FIG. 4 is a block diagram of an electric current control section in the first embodiment of the present disclosure.

As shown in FIG. 4, the first system electric current control section 71 has an electric current instruction calculator 710, a Direct and Quadrature (dq) converter 711, a subtracter 712, a PI calculator 713, and a Pulse Width Modulation (PWM) calculator 714, and generates a control signal concerning a control of the electric current that flows to the first system winding wire group 21.

The electric current instruction calculator 710 calculates a d axis electric current instruction value Id1* and a q axis electric current instruction value Iq1* of the first system 101 by performing a map calculation etc., based on the first system torque instruction value trq1*.

The dq converter 711 performs a dq conversion of the phase currents Iu1, Iv1, and Iw1 detected by the current sensor 41 (i.e., see FIG. 1, the sensor 41 is omitted from FIG. 4), and calculates a d axis electric current detection value Id1 and a q axis electric current detection value Iq1 of the first system 101.

The subtracter 712 calculates a d axis electric current deviation ΔId1, which is a deviation of the d axis electric current instruction value Id1* from the d axis electric current detection value Id1 coming from feedback, and calculates a q axis electric current deviation ΔIq1, which is a deviation of the q axis electric current instruction value Iq1* from the q axis electric current detection value Iq1 coming from feedback.

The PI calculator 713 calculates voltage instruction values Vd1* and Vq1* by performing a PI calculation etc., so that the electric current deviations ΔId1 and ΔIq1 respectively converge to zero. The calculated voltage instruction values Vd1* and Vq1* are converted to voltage instruction values Vu1*, Vq1*, and Vw1* in three phases.

The PWM calculator 714 compares the voltage instruction values Vu1*, Vv1*, and Vw1* in three phases with a carrier wave, and generates a control signal that controls the switching ON and OFF of the switching elements 311-316. The generated control signal is outputted to the first system inverter 31 via the drive circuit 49 (refer to FIG. 2). In such manner, the power supply to the first system winding wire group 21 is controlled.

The second system electric current control section 72 has an electric current instruction calculator 720, a dq converter 721, a subtracter 722, a P1 calculator 723, and a PWM calculator 724, and generates a control signal concerning a control of the electric current which flows to the second system winding wire group 22.

The electric current instruction calculator 720 calculates a d axis electric current instruction value Id2* and a q axis electric current instruction value Iq2* of the second system 102 by performing a map calculation etc., based on the second system torque instruction value trq2*.

The dq converter 721 performs a dq conversion of the phase currents Iu2, Iv2, and Iw2 detected by the current sensor 41, and calculates a d axis electric current detection value Id2 and a q axis electric current detection value Iq2 of the second system 102.

The subtracter 722 calculates a d axis electric current deviation ΔId2, which is a deviation of the d axis electric current instruction value Id2* from the d axis electric current detection value Id2 coming from feedback, and calculates a q axis electric current deviation ΔIq2 which is a deviation of the q axis electric current instruction value Iq2* from the q axis electric current detection value Iq2 coming from feedback.

The PI calculator 723 calculates voltage instruction values Vd2* and Vq2* by performing a PI calculation etc., so that the electric current deviations ΔId2 and ΔIq2 respectively converge to zero. The calculated voltage instruction values Vd2* and Vq2* are converted to voltage instruction values Vu2*, Vv2*, and Vw2* in three phases.

The PWM calculator 724 compares the voltage instruction value Vu2*, Vv2*, and Vw2* in three phases with a carrier wave, and generates a control signal that controls switching ON and OFF of the switching elements 321-326. The generated control signal is outputted to the second system inverter 32 via the drive circuit 49 (see FIG. 2). In such manner, the power supply to the second system winding wire group 22 is controlled.

The responsiveness of the first system electric current control section 71 and the responsiveness of the second system electric current control section 72 may be equal to each other, or may be different from each other. In other words, the control parameter that determines the frequency response may be the same value in both of the first system electric current control section 71 and the second system electric current control section 72, or may be different in the two sections 71, 72.

When the responsiveness of the electric current control is different in the two sections 71, 72, the first system electric current control section 71 may have a low range response (i.e., low frequency or low sensitivity response), which is a minimum degree of electric current response barely realizing the instruction value, and the second system electric current control section 72 may have a high range response reaching to a higher degree of electric current response (i.e., high frequency or high sensitivity response), for example. By setting one of the first system electric current control section 71 and the second system electric current control section 72 to have a low range response, and by setting the other to have a high range response, the vibration and/or the noise is reduced compared to when both sections have a high range response setting.

Further, in the first system electric current control section 71 and the second system electric current control section 72, a non-interference control that reduces interference between the two systems may be performed.

As described in full details above, the controller 50 of the present embodiment controls the motor 20 in the electric power steering system 1 that includes the motor 20 and the inverters 31, 32 as the system components.

The motor 20 has plural winding wire groups 21 and 22, and generates the assist torque that assists the steering operation of the steering wheel 10 by the driver. The inverters 31 and 32 are respectively provided for the winding wire groups 21 and 22 in a corresponding manner. More practically, the first system inverter 31 is provided corresponding to the first system winding wire group 21, and the second system inverter 32 is provided corresponding to the second system winding wire group 22.

The controller 50 is provided with the instruction calculator 51, the distributor 55, and the electric current control section 70.

The instruction calculator 51 calculates the base assist instruction value B0 and at least one of the correction instruction values C10, C20.

The distributor 55 distributes the base assist instruction value B0 and each of the correction instruction values C10, C20 to each of the winding wire groups 21 and 22, and calculates the torque instruction values trq1* and trq2* for each of the winding wire groups 21 and 22.

The electric current control section 70 controls the electric current that flows to the winding wire groups 21 and 22 based on the torque instruction values trq1* and trq2*.

More practically, the first system electric current control section 71 controls the electric current that flows to the first system winding wire group 21 based on the first system torque instruction value trq1* concerning the first system winding wire group 21.

The second system electric current control section 72 controls the electric current that flows to the second system winding wire group 22 based on the second system torque instruction value trq2* concerning the second system winding wire group 22.

The controller 50 of the present embodiment is provided with the distributor 55, and the distributor 55 distributes the base assist instruction value B0 and each of the correction instruction values C10 and C20 to each of the winding wire groups 21 and 22, according to the characteristics of each of the instruction values, and the like.

In such manner, the base assist instruction value B0 and each of the correction instruction values C10, C20 are appropriately distributed to each of the winding wire groups 21 and 22, for the calculation of the torque instruction values trq1* and trq2*, thereby reducing the inter-control interference between the plural assist controls, for example.

Regarding distribution of the base assist instruction value B0 and the correction instruction values C10, C20, the distribution coefficient concerning distributions of those instruction values to each of the winding wire groups 21 and 22 are the numbers between zero and one.

The sum of the distribution coefficients for each of the base assist instruction value B0 and the correction instruction values C10, C20 is equal to one.

In such manner, the base assist instruction value B0 and the correction instruction values C10, C20 are distributable appropriately.

The electric current control section 70 has the control parameter that determines the frequency response being set up for each of the winding wire groups 21 and 22. In other words, a control parameter that determines the frequency response characteristics of the first system electric current control section 71 and a control parameter which determines the frequency response characteristics of the second system electric current control section 72 are different from each other.

In such manner, one of the two sections 71, 72 may be configured to have a low range response, and the other of the two sections 71, 72 may be configured to have a high range response, enabling a reduction of the noise and the vibration.

Second Embodiment

Figure 5:
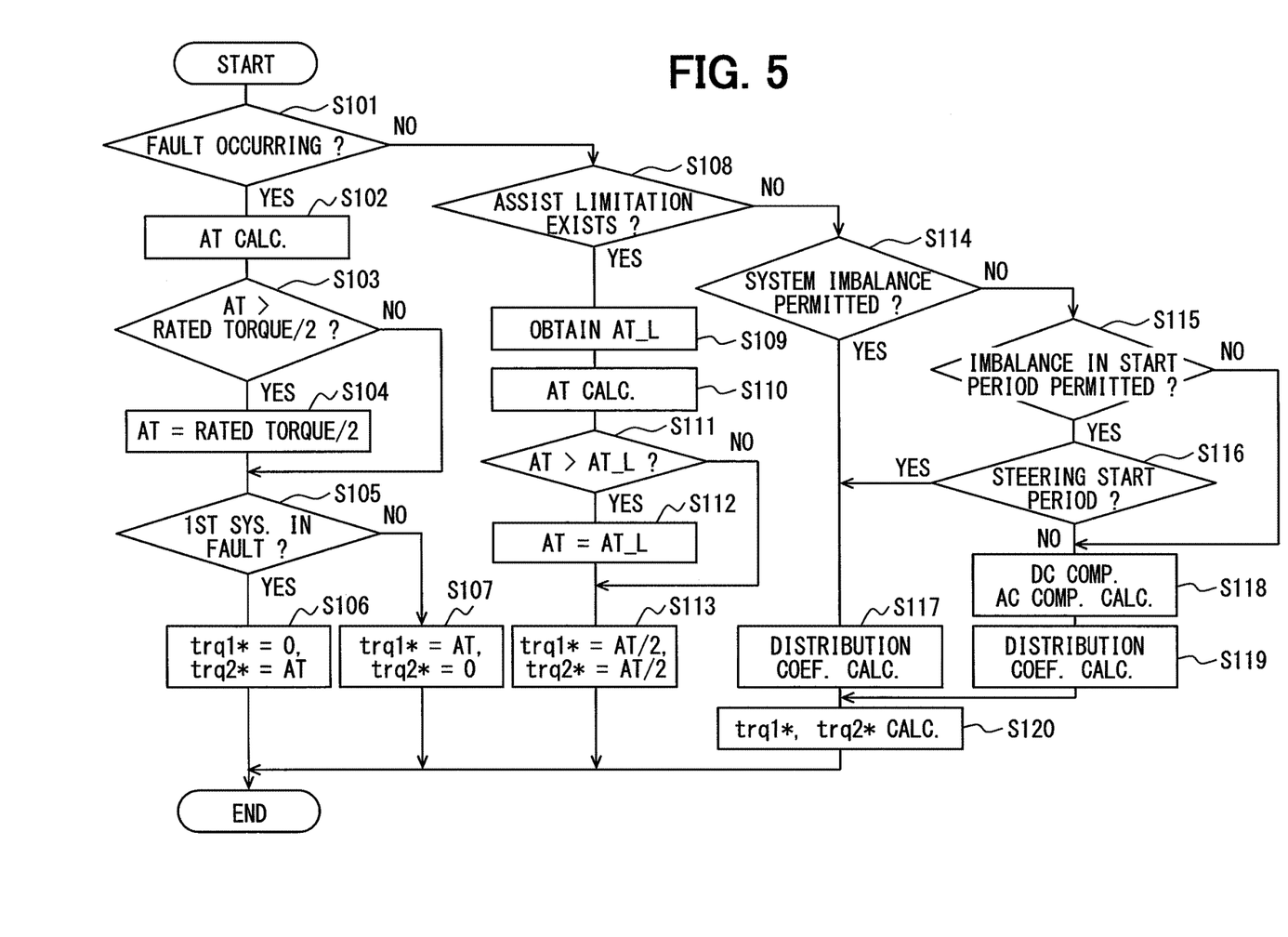
FIG. 5 is a flowchart of a distribution process in a second embodiment of the present disclosure.

The second embodiment of the present disclosure is shown in FIG. 5.

The present embodiment is different from the above-mentioned embodiment about how the distributor 55 performs its control, the description of the present embodiment is described with a focus on such point.

In the present embodiment, the instruction calculator 51 controls the distribution of the instruction values according to its output of the control (i.e., whether the output has a direct current component (i.e., henceforth a "DC component"), or an alternating current component (i.e., henceforth an "AC component")). In the following example, it is assumed that the base assist instruction value B0 is a DC component, and the correction instruction values C10 and C20 are AC components.

It is also assumed that, just after a start of the steering operation or in a steering start period, which is defined as a period of the steering torque Ts being smaller than a determination threshold, a difference between the base assist instruction value B0 and the correction instruction values C10 and C20 is small. That is, in the steering start period, $B0 \approx C10+C20$.

On the other hand, in a normal steering period, which is defined as a period of the steering torque being equal to or greater than the determination threshold, the base assist instruction value B0 is sufficiently greater than the correction instruction values C10 and C20. In other words, $B0 \gg C10+C20$.

The distribution process in the present embodiment is described based on the flowchart shown in FIG. 5. The distribution process is performed at predetermined intervals by the distributor 55.

In step S101 (hereafter, a "step" is replaced with a sign "S"), it is determined whether a fault of one of the two systems occurs. When it is determined that a fault has not occurred (S101:NO), the process proceeds to S108. When it is determined that a fault has occurred (S101:YES), the process proceeds to S102.

In S102, an assist instruction summation value AT is calculated. The assist instruction summation value AT is calculated by an equation (1).

$$AT = B0 + C10 + C20 \qquad \text{Equation (1)}$$

In S103, it is determined whether the assist instruction summation value AT is greater than one half of a rated torque of the motor 20. When the assist instruction summation value AT is determined to be ½ or less of the rated torque (S103:NO), the process proceeds to S105. When the assist instruction summation value AT is determined to be greater than one half of the rated torque (S103:YES), the process proceeds to S104.

In S104, since the first system 101 or the second system 102 which has a fault cannot be used, the assist instruction summation value AT is restricted to one half of the rated torque.

In S105, it is determined whether the system having a fault is the first system 101 or not. In the flowchart, the first system 101 is designated as "1st system." When it is determined that the system having a fault is the first system 101 (S105:YES), the process proceeds to S106. When it is determined that the system having a fault is not the first system 101 (i.e., when the system having a fault is the second system 102) (S105:NO), the process proceeds to S107.

In S106, the first system torque instruction value trq1* and the second system torque instruction value trq2* are calculated. In this case, the first system torque instruction value trq1* concerning the first system 101 having a fault is set to zero, and the second system torque instruction value trq2* is set to the assist instruction summation value AT. That is, the first system torque instruction value trq1* and the second system torque instruction value trq2* are represented by equations (2-1) and (2-2).

$$trq1^* = 0 \quad \text{Equation (2-1)}$$

$$trq2^* = AT \quad \text{Equation (2-2)}$$

In S107, the first system torque instruction value trq1* and the second system torque instruction value trq2* are calculated. Here, the second system torque instruction value trq2* concerning the second system 102 having a fault is set to zero, and the first system torque instruction value trq1* is set to the assist instruction summation value AT. That is, the first system torque instruction value trq1* and the second system torque instruction value trq2* are represented by equations (3-1) and (3-2).

$$trq1^* = AT \quad \text{Equation (3-1)}$$

$$trq2^* = 0 \quad \text{Equation (3-2)}$$

In S108, which comes after a determination that a fault has not occurred (S101:NO), it is determined whether any assist limitation exists. For example, when the switching elements 311-316, 321-326 or the winding wire groups 21 and 22 have high temperature (i.e., are in an overheated state), the assist instruction summation value AT is limited or restricted. When it is determined that no assist limitation exists (S108:NO), the process proceeds to S114. When it is determined that an assist limitation exists (S108:YES), the process proceeds to S109.

In S109, an assist limitation value AT_L is obtained.

In S110, the assist instruction summation value AT is calculated just like S102.

In S111, it is determined whether the assist instruction summation value AT is greater than the assist limitation value AT_L.

When it is determined that the assist instruction summation value AT is equal to or less than the assist limitation value AT_L (S111:NO), the process proceeds to S113.

When it is determined that the assist instruction summation value AT is greater than the assist limitation value AT_L (S111:YES), the process proceeds to S112.

In S112, the assist instruction summation value AT is limited to the assist limitation value AT_L.

In S113, the assist instruction summation value AT is distributed by a predetermined ratio, and the first system torque instruction value trq1* and the second system torque instruction value trq2* are calculated.

Here, the assist instruction summation value AT is evenly distributed, and the first system torque instruction value trq1* and the second system torque instruction value trq2* are respectively set to one half of the assist instruction summation value AT. That is, the first system torque instruction value trq1* and the second system torque instruction value trq2* are represented by equations (4-1) and (4-2).

$$trq1^* = AT/2 \quad \text{Equation (4-1)}$$

$$trq2^* = AT/2 \quad \text{Equation (4-2)}$$

That is, according to the present embodiment, in a situation where an assist limitation applies, without performing an instruction-specific distribution of the instruction values B0, C10, C20, the assist instruction summation value AT is distributed to each of the two systems 101 and 102 by the predetermined ratio. This is because the reduction of the inter-control interference by the distribution control is reduced in such a situation (i.e., is hardly expected).

In S114, which comes after determining that a fault has not occurred (S101:NO), and that no assist limitation exists (S108:NO), it is determined whether system imbalance (i.e., uneven distribution of the instruction values among two systems) is permitted regardless of the steering state.

When it is determined that the system imbalance is permitted regardless of the steering state (S114:YES), the process proceeds to S117. When it is determined that the system imbalance is not permitted depending on the steering state (S114:NO), the process proceeds to S115.

In S115, it is determined whether the system imbalance in the steering start period is permitted. When it is determined that the system imbalance in the steering start period is not permitted (S115:NO), the process proceeds to S118.

In S116, it is determined whether it is in the steering start period. According to the present embodiment, when the steering torque Ts is equal to or less than the determination threshold, it is determined that it is in the steering start period. When it is determined that it is in the steering start period (S116:YES) (i.e., when it is determined that the steering torque Ts is equal to or less than the determination threshold), the process proceeds to S117. When it is determined that it is not in the steering start period (i.e., when the steering torque Ts is greater than the determination threshold) (S116:NO), the process proceeds to S118.

In S117, which comes after a determination that the system imbalance is permitted (S114:YES, or S115 and S116:YES), the distribution coefficients Kb1, Kb2, Kc11, Kc12, Kc21 and Kc22 are calculated.

According to the present embodiment, when the system imbalance is permitted, the DC component is outputted from one system (i.e., from the first system 101 in the present embodiment), and the AC component is outputted from the other system (i.e., from the second system 102 in the present embodiment).

For outputting the DC component from the first system 101, the distribution coefficients Kb1 and Kb2 are represented by equations (5-1) and (5-2). For outputting the AC component from the second system 102, the distribution coefficients Kc11 and Kc12 are represented by equations (6-1), (6-2), and the distribution coefficients Kc21 and Kc22 are represented by equations (7-1) and (7-2).

$$Kb1=1 \quad \text{Equation (5-1)}$$

$$Kb2=0 \quad \text{Equation (5-2)}$$

$$Kc11=0 \quad \text{Equation (6-1)}$$

$$Kc12=1 \quad \text{Equation (6-2)}$$

$$Kc21=0 \quad \text{Equation (7-1)}$$

$$Kc22=1 \quad \text{Equation (7-2)}$$

In S118, which comes after a determination that the system imbalance is not permitted (S114 and S115:NO, or S114:NO, S115:YES, and S116:NO), a DC component Tdc of the assist instruction summation value AT (i.e., henceforth simply designated as the "DC component") and an AC component Tac of the assist instruction summation value AT (i.e., henceforth simply designated as the "AC component") are calculated.

The DC component Tdc and the AC component Tac are calculated by equations (8) and (9).

$$Tdc=B0 \quad \text{Equation (8)}$$

$$Tac=C10+C20 \quad \text{Equation (9)}$$

In S119, the distribution coefficients Kb1, Kb2, Kc11, Kc12, Kc21, and Kc22 are calculated. Here, it is assumed that the DC component Tdc is greater than the AC component Tac (i.e., Tdc>Tac). Based on such assumption, the distribution coefficients Kb1 and Kb2 are represented by equations (10-1) and (10-2) so that the DC component Tdc is output from the first system 101 as much as possible, while the second system 102 bears the output of the rest of the DC component Tdc and the output of the AC component Tac. The distribution coefficients Kc11, Kc12, Kc21, and Kc22 are represented by equations (6-1), (6-2), (7-1) and (7-2) just like S117.

$$Kb1=(Tdc+Tac)/(2\times Tdc) \quad \text{Equation (10-1)}$$

$$Kb2=(Tdc-Tac)/(2\times Tdc) \quad \text{Equation (10-2)}$$

In S120, the first system torque instruction value trq1* and the second system torque instruction value trq2* are calculated using the distribution coefficients Kb1, Kb2, Kc11, Kc12, Kc21 and Kc22 calculated in S117 or S119. The first system torque instruction value trq1* and the second system torque instruction value trq2* are calculated by equations (11-1) and (11-2).

$$trq1^*=B0\times Kb1+C10\times Kc11+C20\times Kc21 \quad \text{Equation (11-1)}$$

$$trq2^*=B0\times Kb2+C10\times Kc12+C20\times Kc22 \quad \text{Equation (11-2)}$$

According to the present embodiment, the distributor 55 distributes the base assist instruction value B0 and the correction instruction values C10, C20 according to whether the output is the direct current component, or whether the output is the alternating current component. In such manner, interference between the direct current component and the alternating current component is reduced.

When a fault occurs in the first system winding wire group 21 or in the first system inverter 31 corresponding to the first system winding wire group 21, the distribution of the base assist instruction value B0 and the correction instruction values C10, C20 to the first system winding wire group 21 is stopped (S105:YES, S106 in FIG. 5).

When a fault occurs in the second system winding wire group 22 or in the second system inverter 32 corresponding to the second system winding wire group 22, the distribution of the base assist instruction value B0 and the correction instruction values C10, C20 to the second system winding wire group 22 is stopped (S105:NO, S107).

In other words, the distributor 55 does not distribute the base assist instruction value B0 and the correction instruction values C10, C20 to the system having a fault.

In such manner, the drive of the motor 20 is continued with the normal system, without using the fault-occurring system.

The same effects as the above-mentioned embodiment are achieved.

Third Embodiment

Figure 6:
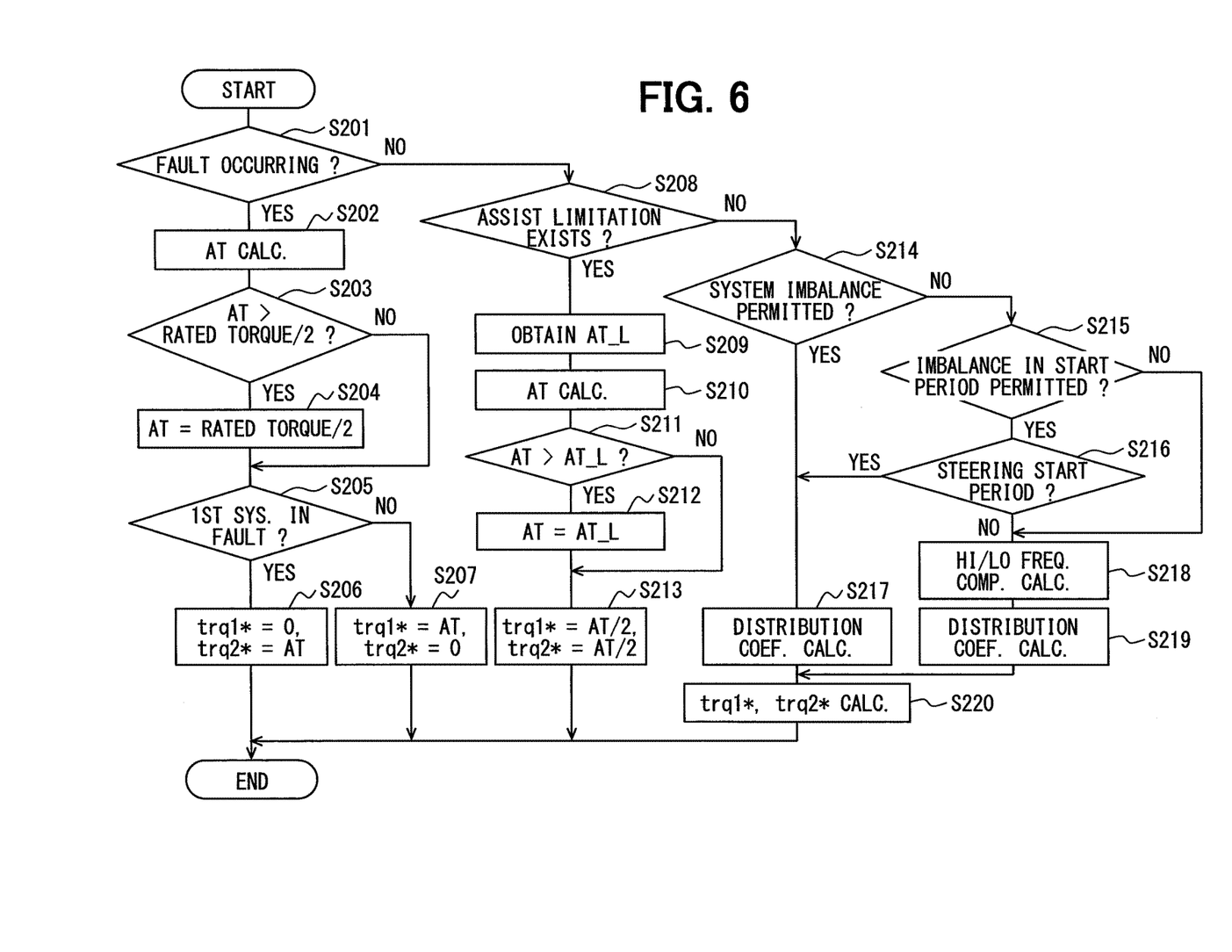
FIG. 6 is a flowchart of the distribution process in a third embodiment of the present disclosure.

The third embodiment of the present disclosure is shown in FIG. 6.

According to the second embodiment, the output of each control from the instruction calculator 51 is determined either as the direct current component or the alternating current component, and the instruction values are distributed according to such determination.

In the present embodiment, the output of each control from the instruction calculator 51 is determined either as a low frequency wave or a high frequency, and the distribution of the instruction values is controlled according to such determination. In the following example, it is assumed that the base assist instruction value B0 is a low frequency wave, and the correction instruction values C10, C20 are a high frequency wave.

The assumption regarding the instruction value B0, C10, C20 are the same as that of the second embodiment.

The distribution process in the present embodiment is described based on a flowchart shown in FIG. 6. S201-S217 and S220 are the same as that of S101-S117, and S120 in FIG. 5.

In S218, a low frequency component TL and a high frequency component TH of the assist instruction summation value AT are calculated. The low frequency component TL and the high frequency component TH are calculated by equations (12) and (13).

$$TL=B0 \quad \text{Equation (12)}$$

$$TH=C10+C20 \quad \text{Equation (13)}$$

In S219, the distribution coefficients Kb1, Kb2, Kc11, Kc12, Kc21 and Kc22 are calculated. Here, it is assumed that the low frequency component TL is greater than the high frequency component TH (i.e., TL>TH). Based on such assumption, the distribution coefficients Kb1 and Kb2 are represented by equations (14-1) and (14-2), so that the low frequency component TL is output from the first system 101 as much as possible, while the second system 102 outputs the rest of the low frequency component TL together with outputting the high frequency component TH. The distribution coefficients Kc11, Kc12, Kc21 and Kc22 are represented by equations (6-1), (6-2), (7-1), and (7-2).

$$Kb1=(TL+TH)/(2\times TL) \quad \text{Equation (14-1)}$$

$$Kb2=(TL-TH)/(2\times TL) \quad \text{Equation (14-2)}$$

According to the present embodiment, the distributor 55 distributes the base assist instruction value B0 and the correction instruction values C10, C20 according to the frequency component included in the instruction values or the subject frequency band which is intended to be controlled by the instruction values. In such manner, interference between the low frequency component and the high frequency component is reduced.

Further, the same effects as the above-mentioned embodiments are also achieved.

Fourth Embodiment

Figure 7:
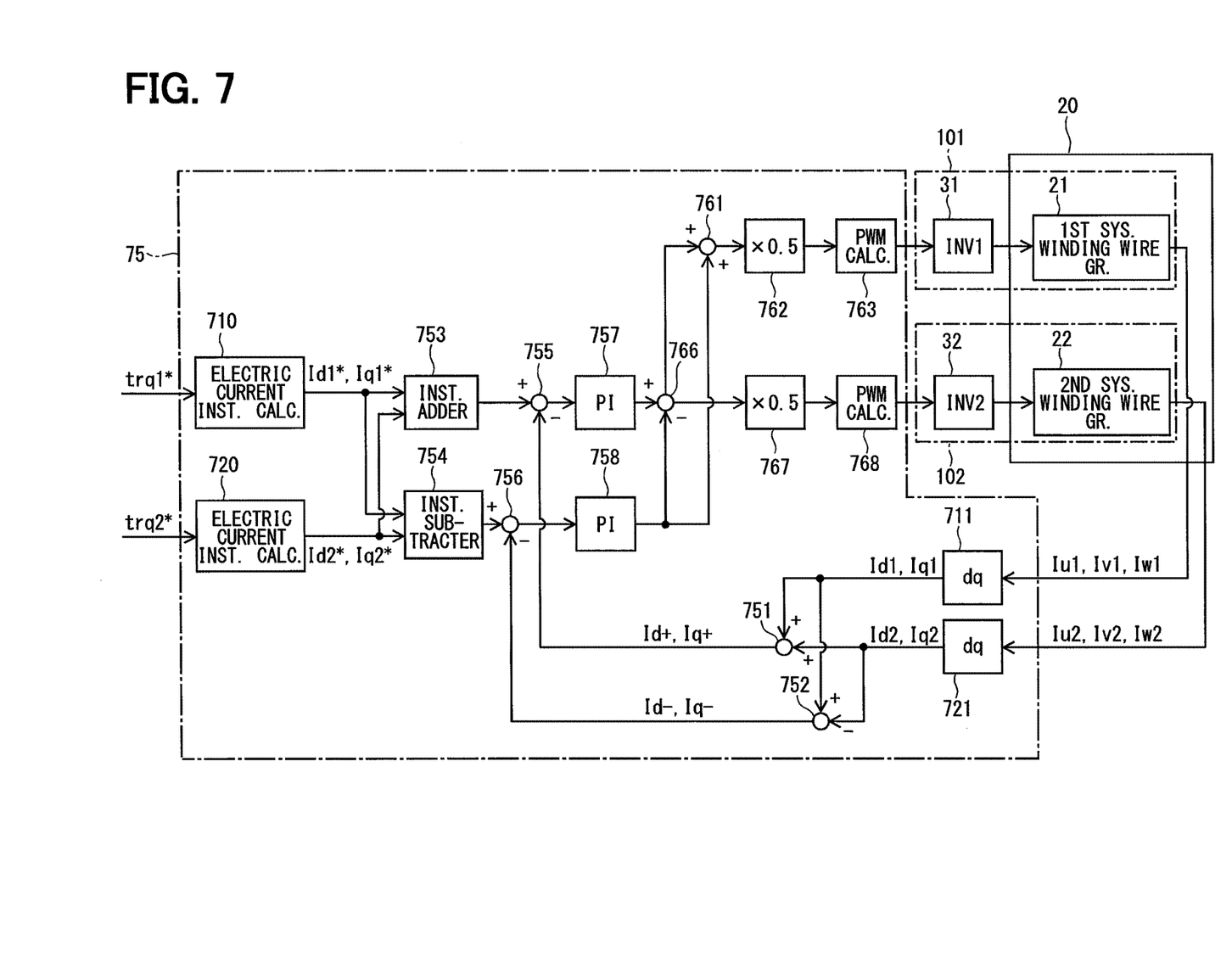
FIG. 7 is a block diagram of the electric current control section in a fourth embodiment of the present disclosure.

The fourth embodiment of the present disclosure is shown in FIG. 7.

According to the present embodiment, an electric current control section 75 differs from the above-mentioned embodiments. The distribution process in the distributor 55 and the like may be the same as any one of the first embodiment to the third embodiment. Further, in the present embodiment, it is assumed that the responsiveness of the electric current control in the first system 101 and the responsiveness of the electric current control in the second system 102 are the same.

The electric current control section 75 has the electric current instruction calculators 710 and 720, the dq converters 711 and 721, an adder 751, a subtracter 752, an instruction adder 753, an instruction subtracter 754, subtracters 755 and 756, PI calculators 757 and 758, an adder 761, a subtracter 766, and converters 762 and 767, and PWM calculators 763 and 768.

The adder 751 adds the d axis electric current detection value Id1 concerning the first system 101 on which the dq conversion is performed by the dq converter 711, and the d axis electric current detection value Id2 concerning the second system 102 on which the dq conversion is performed by the dq converter 721, and calculates a d axis electric current addition value Id+.

The adder 751 adds the q axis electric current detection value Iq1 concerning the first system 101 on which the dq conversion is performed by the dq converter 711, and the q axis electric current detection value Iq2 concerning the second system 102 on which the dq conversion is performed by the dq converter 721, and calculates a q axis electric current addition value Iq+.

The subtracter 752 subtracts the d axis electric current detection value Id2 of the second system 102 from the d axis electric current detection value Id1 of the first system 101, and calculates a d axis electric current subtraction value Id−.

The subtracter 752 subtracts the q axis electric current detection value Iq2 of the second system 102 from the q axis electric current detection value Iq1 of the first system 101, and calculates a q axis electric current subtraction value Iq−.

The instruction adder 753 adds the d axis electric current instruction value Id1* of the first system 101 and the d axis electric current instruction value Id2* of the second system 102, and calculates a d axis addition electric current instruction value Id+*.

The instruction adder 753 adds the q axis electric current instruction value Iq1* of the first system 101 and the q axis electric current instruction value Iq2* of the second system 102, and calculates a q axis addition electric current instruction value Iq+*.

The instruction subtracter 754 subtracts the d axis electric current instruction value Id2* of the second system 102 from the d axis electric current instruction value Id1* of the first system 101, and calculates a d axis subtraction electric current instruction value Id−*.

The instruction subtracter 754 subtracts the q axis electric current instruction value Iq2* of the second system 102 from the q axis electric current instruction value Iq1* of the first system 101, and calculates a q axis subtraction electric current instruction value Iq−*.

The subtracter 755 calculates a d axis addition electric current deviation ΔId+, which is a deviation of the d axis addition electric current instruction value Id+* from the d axis electric current addition value Id+.

The subtracter 755 calculates a q axis addition electric current deviation ΔIq+, which is a deviation of the q axis addition electric current instruction value Iq+* from the q axis electric current addition value Iq+.

The subtracter 756 calculates a d axis subtraction electric current deviation ΔId−, which is a deviation of the d axis subtraction electric current instruction value Id−* from the d axis electric current subtraction value Id−.

The subtracter 756 calculates a q axis subtraction current deviation ΔIq−, which is a deviation of the q axis subtraction electric current instruction value Iq−* from the q axis electric current subtraction value Iq−.

The PI calculator 757 calculates addition voltage instruction values Vd+* and Vq+* by the PI calculation etc., so that the addition electric current deviations ΔId+ and ΔIq+ respectively converge to zero.

The PI calculator 758 calculates subtraction voltage instruction values Vd−* and Vq−* by the PI calculation etc., so that the subtraction current deviation ΔId− and ΔIq− respectively converge to zero.

The adder 761 adds the added voltage instruction value Vd+* and subtraction voltage instruction value Vd−* about a d axis to calculate a pre-conversion first system voltage instruction value Vd1*_b, and adds the added voltage instruction value Vq+* and the subtraction voltage instruction value Vq−* about a q axis to calculate a pre-conversion first system voltage instruction value Vq1*_b.

In the converter 762, the pre-conversion first system voltage instruction values Vd1*_b and Vq1*_b are multiplied by a scaling factor 0.5, for the calculation of first system voltage instruction values Vd1* and Vq1*. Further, the calculated voltage instruction values Vd1* and Vq1* are converted to the voltage instruction values Vu1*, Vv1*, and Vw1* in three phases.

Just like the PWM calculator 714 in FIG. 4, the PWM calculator 763 compares the voltage instruction values Vu1*, Vv1*, and Vw1* with a carrier wave, and generates a control signal that controls the switching ON and OFF of the switching elements 311-316.

The subtracter 766 subtracts the subtraction voltage instruction value Vd−* from the addition voltage instruction value Vd+* about the d axis to calculate the pre-conversion second system voltage instruction value Vd2*_b, and subtracts the subtraction voltage instruction value Vq−* from the added voltage instruction value Vq+* to about the q axis to calculate the pre-conversion second system voltage instruction value Vq2*_b.

In the converter 767, the pre-conversion second system voltage instruction values Vd2*_b and Vq2*_b are multiplied by a scaling factor 0.5, for the calculation of the second system voltage instruction values Vd2* and Vq2*. Further, the calculated voltage instruction values Vd2* and Vq2* are converted to the voltage instruction values Vu2*, Vv2*, and Vw2* in three phases.

Just like the PWM calculator 724 in FIG. 4, the PWM calculator 768 compares the voltage instruction values Vu2*, Vv2*, and Vw2* with a carrier wave, and generates a control signal which controls the switching ON and OFF of the switching elements 321-326.

In the electric current control section 75, a non-interference control that reduces interference between the two systems may be performed, just like the first embodiment.

According to the present embodiment, addition and subtraction are performed for the appropriate electric current control. In such manner, the influence of the temperature change, and the variation among individual electric components and elements etc., are reduced.

Further, the same effects as the above-mentioned embodiment are also achievable.

Other Embodiments (a) the Number of the Systems

In the above-mentioned embodiments, the number of the systems is two.

In other embodiments, the number of the systems may be three or more. That is, the number of winding wire groups is three or more, and the inverter may be provided in a corresponding manner to each of the winding wire groups.

(b) Instruction Calculator

In the above-mentioned embodiment, the number of the correction instruction calculators is two.

In other embodiments, the number of the correction instruction calculators may be three or more, and may calculate three or more correction instruction values.

(c) Distributor

In the third embodiment, the base assist instruction value is a direct current component, and the correction instruction value is an alternating current component.

In other embodiments, at least a part of the correction instruction value may be a direct current component. Further, regarding the direct current component, when the correction instruction value rather than the base assist instruction value needs to be controlled to avoid interference with the alternating current component, the correction instruction value may be output from one of the two systems in a prioritized manner.

In the fourth embodiment, the base assist instruction value is a low frequency component, and the correction instruction value is the high frequency component.

In other embodiments, at least a part of the correction instruction value may be a low frequency component. Further, regarding the low frequency component, when the correction instruction value rather than base assist instruction value needs to be controlled to avoid interference with the high frequency component, the correction instruction value may be output from one of the two systems in a prioritized manner.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A controller for controlling a motor that comprises an electric power steering system together with and an inverter, the motor having a plurality of winding wire groups generating an assist torque that assists a steering operation of a steering member by a driver, and the inverter being provided for each of the plurality of winding wire groups, the controller comprising:

an instruction calculator calculating a base assist instruction value and at least one correction instruction value;

a distributor calculating, for each of the plurality of winding wire groups, a distributed instruction value for each of the base assist instruction value; and the at least one correction instruction value by distributing the base assist instruction value and the at least one correction instruction value; and an electric current control section controlling an electric current flowing in each of the plurality of winding wire groups based on the distributed instruction value, wherein the distributor includes a base distribution coefficient calculator calculating a distribution coefficient for distributing the base assist instruction value to apply to the base assist instruction value.

2. The controller of claim 1, wherein the distribution coefficient for distributing the base assist instruction value and a distribution coefficient for distributing the at least one correction instruction value has a value between zero and one including the zero and the one, and a sum total of the distribution coefficient for distributing the base assist instruction value and a sum total of the distribution coefficient for distributing the at least one correction instruction value are respectively equal to one.

3. The controller of claim 1, wherein the distributor distributes the base assist instruction value and the at least one correction instruction value according to whether the respective instruction values are a direct electric current component or an alternating electric current component.

4. The controller of claim 1, wherein the distributor distributes the base assist instruction value and the at least one correction instruction value according to a frequency component included in the respective instruction values, or according to a frequency band intended to be controlled by the respective instruction values.

5. The controller of claim 1, wherein the electric current control section has a control parameter that determines a frequency response being set for each of the plurality of winding wire groups.

6. The controller of claim 1, wherein the distributor stops a distribution of the base assist instruction value and a distribution of the at least one correction instruction value to the faulty winding wire group, when at least one of the plurality of winding wire groups or the inverter corresponding to the at least one of the plurality has a fault.

7. The controller of claim 1, wherein the distributor includes a correction distribution coefficient calculator calculating a distribution coefficient for distributing the at least one correction instruction value to apply to the at least one correction instruction value.

8. The controller of claim 7, wherein the distribution coefficient for distributing the base assist instruction value and the distribution coefficient for distributing the at least one correction instruction value each have a value between zero and one including the zero and the one, and a sum total of the distribution coefficient for distributing of the base assist instruction value and a sum total of the distribution coefficient for distributing the at least one correction instruction value are respectively equal to one.

9. The controller of claim 1, wherein the distributed instruction value for the at least one correction instruction value is calculated separately from the base assist instruction value.

* * * * *

UNITED STATES PATENT AND TRADEMARK OFFICE
CERTIFICATE OF CORRECTION

PATENT NO.        : 9,660,565 B2
APPLICATION NO.   : 15/043213
DATED             : May 23, 2017
INVENTOR(S)       : Shuji Kuramitsu et al.

It is certified that error appears in the above-identified patent and that said Letters Patent is hereby corrected as shown below:

In the Specification

In Column 2 at Line 50, After "motor" insert --20--.

In Column 4 at Line 26, Before "reverse," delete "10o".

In Column 5 at Line 36, Change "cam" to --ωm--.

In Column 14 at Lines 36-38, Delete "S201-S217 and S220 are the same as that of S101-S117, and S120 in FIG. 5." and insert the same on Column 14, Line 37, as a new paragraph.

In the Claims

In Column 18 at Line 8, In Claim 1, change "value;" to --value--.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*